US010991064B1

(12) United States Patent
Belovay et al.

(10) Patent No.: US 10,991,064 B1
(45) Date of Patent: Apr. 27, 2021

(54) SYSTEM AND METHOD OF APPLYING WATERMARK IN A DIGITAL IMAGE

(71) Applicant: Adventure Soup Inc., Vancouver (CA)

(72) Inventors: Keith Emery Belovay, Kitchener (CA); Neal Hugh Belovay, Kitchener (CA)

(73) Assignee: Adventure Soup Inc., Vancouver (CA)

( * ) Notice: Subject to any disclaimer, the term of this patent is extended or adjusted under 35 U.S.C. 154(b) by 152 days.

(21) Appl. No.: 16/294,927

(22) Filed: Mar. 7, 2019

Related U.S. Application Data

(60) Provisional application No. 62/639,879, filed on Mar. 7, 2018.

(51) Int. Cl.
| | | |
|---|---|---|
| *G06T 1/00* | (2006.01) | |
| *G06T 7/73* | (2017.01) | |
| *G06Q 30/06* | (2012.01) | |
| *G06T 7/33* | (2017.01) | |
| *G06T 7/13* | (2017.01) | |

(52) U.S. Cl.
CPC ....... *G06T 1/0028* (2013.01); *G06Q 30/0641* (2013.01); *G06T 7/33* (2017.01); *G06T 7/73* (2017.01); *G06T 7/13* (2017.01); *G06T 2201/0064* (2013.01)

(58) Field of Classification Search
CPC ....... G06T 1/0021; G06T 1/0028; G06T 7/11; G06T 7/13; G06T 2201/0064; G06T 2201/0203; G06K 9/46; H04N 1/32208; H04N 1/32229; H04N 1/32347; H04N 2201/325
See application file for complete search history.

(56) References Cited

U.S. PATENT DOCUMENTS

| | | | |
|---|---|---|---|
| 6,750,919 B1 | 6/2004 | Rosser | 348/584 |
| 7,756,288 B2 | 7/2010 | Lubin et al. | 382/100 |
| 8,243,984 B1 | 8/2012 | Brown et al. | 382/100 |
| 9,026,796 B2 | 5/2015 | Dettinger et al. | H04L 9/3247 |
| 9,423,901 B2 | 8/2016 | Bustamante | G06F 3/0412 |
| 2004/0036924 A1* | 2/2004 | Ihara | H04N 1/32208 358/3.28 |
| 2004/0263911 A1* | 12/2004 | Rodriguez et al. | G06T 1/0021 358/3.28 |
| 2016/0335764 A1 | 11/2016 | Kawagishi et al. | G06T 7/0012 |
| 2017/0104893 A1 | 4/2017 | Hardy et al. | H04N 1/4493 |
| 2018/0075033 A1 | 3/2018 | Estok | G06F 17/30038 |
| 2018/0158177 A1 | 6/2018 | Lannes et al. | G06T 5/002 |
| 2018/0249037 A1 | 8/2018 | Shono | H04N 1/32149 |

* cited by examiner

*Primary Examiner* — Andrew W Johns
(74) *Attorney, Agent, or Firm* — Voyer Law

(57) ABSTRACT

A system for protecting a proprietary medium is provided, the system comprising a processor and a memory having instructions stored thereon that when executed by the processor cause the processor to: identify at least one first feature of interest in an original digital image; generate a watermarked copy of the original image and generate a masked copy of the original image in which the first feature of interest is masked; combine the watermarked copy with the masked copy to provide a modified watermarked copy having a region of lower intensity watermarking corresponding to the location of the first feature of interest in the original digital image; and overlay the modified watermarked copy over the original image to provide a final copy in which the regions of lower intensity watermarking are aligned with the first feature of interest.

9 Claims, 19 Drawing Sheets

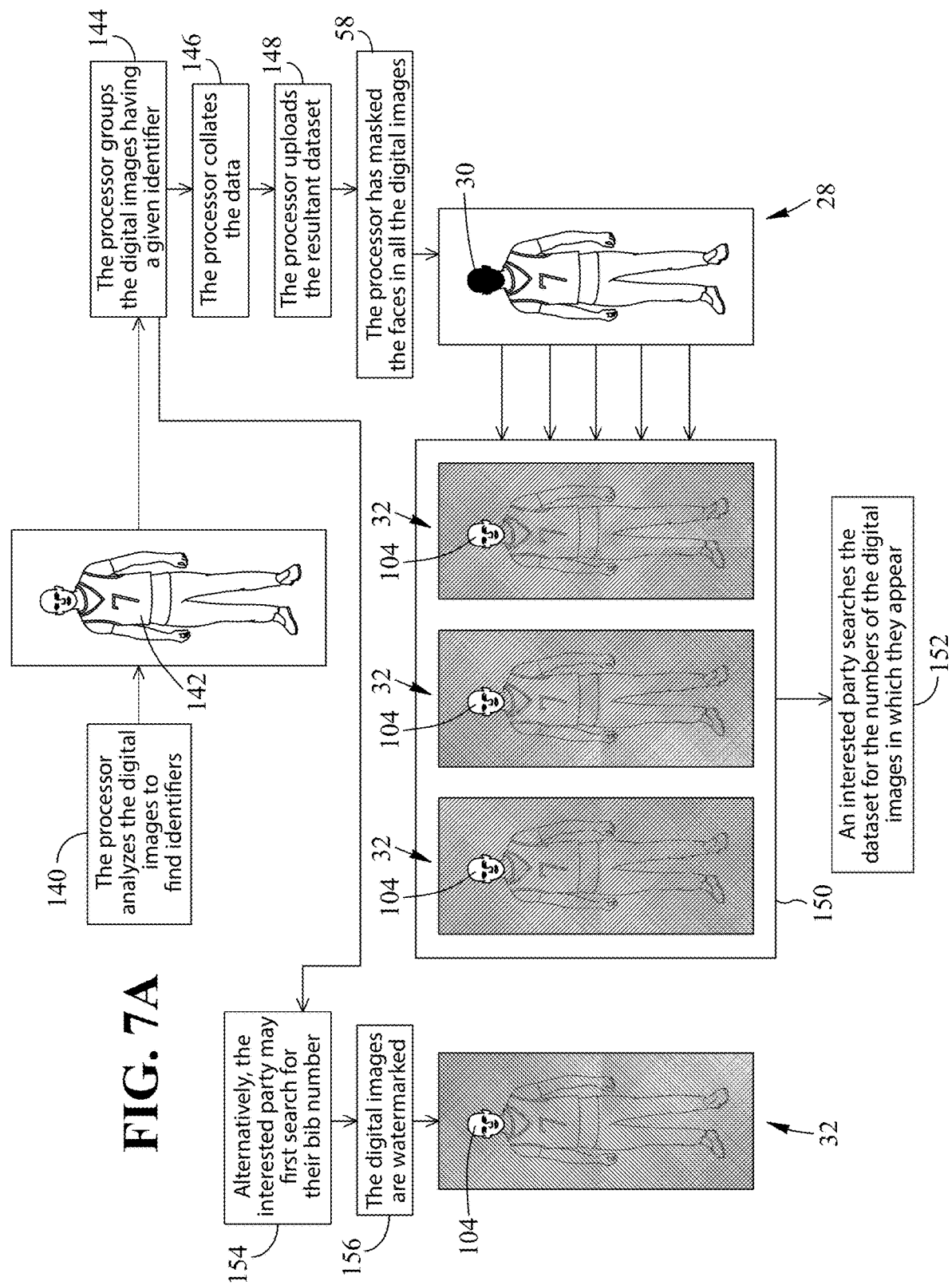

SYSTEM AND METHOD OF APPLYING WATERMARK IN A DIGITAL IMAGE

CROSS REFERENCE TO RELATED APPLICATIONS

This application claims benefit of U.S. Provisional Patent Application Ser. No. 62/639,879, filed on Mar. 7, 2018, and entitled SYSTEM AND METHOD OF APPLYING WATERMARK IN A DIGITAL IMAGE, the contents of which are incorporated herein by reference.

FIELD

The present technology is a system that identifies features in a proprietary digital image, creates a watermark on the digital image and selectively reduces or eliminates the watermark on the identified features. More specifically, it is a system and a method for providing digital images for marketing and sales purposes that allow a prospective purchaser to view features such as faces, while obscuring at least a portion of the remainder of the digital image.

BACKGROUND

Watermarks are used on digital photographic images to dissuade people from stealing the digital images. There are many examples of such watermarked digital images, for example: www.smugsmug.com. The owner of the photographs retains the original version, smugmug watermarks a copy, often with a centrally located watermark, or a watermark that covers a substantial part of the photograph and uploads the watermarked copy on a website. A potential purchaser views the watermarked copy, and if they like it, will request to purchase the original version. The watermarking process tends to be non-selective, in other words, it appears the same on all photographs. A major deficiency of this approach is that a potential purchaser cannot see aspects of the digital image that are of importance to them, for example, but not limited to, facial expression and what their eyes are focused on.

There are, however, systems and methods for altering specific regions of a digital image, for example, United States Patent Application 20180249037 discloses an image forming system that prevents leakage of confidential data. In the image forming system, a terminal includes a confidential-data-transmitting unit, a code-image-acquiring unit, and a confidential-document-data-creating unit. The confidential-data-transmitting unit transmits confidential data specified for confidentiality inside a document of document data to a server. The code-image-acquiring unit acquires a code image for outputting the confidential data from the server. The confidential-document-data-creating unit creates confidential-document data in which the code image is added to the document data. A server includes a confidential-data-acquiring unit, a code-image-creating unit, a code-image-transmitting unit, and a code-confidential-data-transmitting unit. The confidential-data-acquiring unit acquires the confidential data that is transmitted from the terminal. The code-image-creating unit creates the code image for outputting the confidential data. The code-image-transmitting unit transmits the code image to the terminal. The code-confidential-data-transmitting unit transmits the confidential data to an image forming apparatus. An image forming apparatus includes a decoding unit, a code-confidential-data-acquiring unit and an output-data-creating unit. The decoding unit decodes the code image from the confidential-document data that includes the code image. The code-confidential-data-acquiring unit acquires the confidential data from the code-confidential-data-transmitting unit according to the contents of the code image. The output-data-creating unit creates output data in which the confidential data is included in the confidential-document data. The system simply embeds a watermark but does not discern aspects of an image and place the watermark to avoid selected regions of the image.

United States Patent Application 20180158177 discloses a system for processing images including a main neural network, preferably convolution-based (CNN), and at least one preprocessing neural network, preferably convolution-based, upstream of the main neural network, for carrying out before processing by the main neural network at least one parametric transformation f, differentiable with respect to its parameters, this transformation being applied to at least part of the pixels of the image and being of the form $p'= f(V(p), \Theta)$ where p is a processed pixel of the original image or of a decomposition of this image, p' the pixel of the transformed image or of its decomposition, $V(p)$ is a neighborhood of the pixel p, and $\Theta$ a vector of parameters, the preprocessing neural network having at least part of its learning which is performed simultaneously with that of the main neural network. Included in the system are operators that allow various filterings such as histogram equalization, the correction of the dynamic swing of the image, the deletion of patterns (for example of digital watermark or "watermarking" type) or the frequency correction and the cleaning of the image by setting up a system for recovering relevant information in an image. The system does not discern aspects of an image and place the watermark to avoid selected regions of the image.

United States Patent Application 20180075033 discloses that methods and apparatuses generate and render data embedded with associated meta-data in a human or machine recognizable format. The apparatus includes an obtaining device to acquire first data in a predetermined format and associated second data comprising information of the first data, and to output the first data and the associated second data; a processing device to receive the first data and the associated second data from the obtaining device, to process the first data and the associated second data to thereby generate meta-data based on the first data and/or the associated second data, to convert the meta-data into the predetermined format of the first data, and to embed the converted meta-data into the first data as a combined data in the predetermined format; and a rendering device to receive the combined data from the processing device, and to render the combined data in the human or machine recognizable format. It is disclosed that the location of the meta-data sub-image in the image, when rendered, may be in a predetermined portion of the image. Examples of such locations include a particular corner of a rectangular image, or a border of the rectangular image that may be added or augmented to an existing or standard border. Additionally, the meta-data sub-image, when rendered with the image, may be a watermark that is semi-visible, semi-transparent, or translucent. The system does not discern aspects of an image and place the watermark to avoid selected regions of the image.

United States Patent Application 20170104893 discloses a system and method for analyzing and rendering captured images and/or manipulating pixels to disrupt the capture process and/or captured images from a screen display thereby rendering all or part of the captured images not readily recognizable to a viewer. This system manipulates the image during the capture process, hence there is no copy of the original image. It does not use watermarks.

United States Patent Application 20160335746 discloses a system for previewing protected media comprising a touchscreen display, a processor, and a memory having executable instructions stored thereon that when executed by the processor cause the processor to receive an original image from a server over a network, generate a blurred copy of the original image, overlay the blurred image over the original image, detect user interaction on the touchscreen display, determine location of the user interaction, and apply a mask on a section of the blurred copy of the original image corresponding to the determined location of the user interaction. As noted, this system requires user interaction. The system does not autonomously discern aspects of an image and place the watermark to avoid selected regions of the image.

U.S. Pat. No. 9,423,901 discloses various systems and methods for controlling screen captures. A system comprises a touchscreen; a display module communicatively coupled to the touchscreen, the display module to display on the touchscreen an image in a blurred state to a user; a touchscreen module communicatively coupled to the touchscreen, the touchscreen module to detect a contact point on the touchscreen resulting from the user touching the touchscreen; wherein the display module is to display the image in a focused state on the touchscreen in response to the touchscreen module detecting the contact point; wherein the touchscreen module is to detect a change in the contact point; and wherein the display module is to display the image in the blurred state in response to the touchscreen module detecting the change in the contact point. As noted, this system requires user interaction. The system does not autonomously discern aspects of an image and place the watermark to avoid selected regions of the image.

U.S. Pat. No. 9,026,796 discloses a method, apparatus, and program product for using watermarks to embed security features on avatars in a virtual world. A watermark engine receives security information for an avatar in a virtual world. The watermark engine creates a watermark for the avatar using the security information and associates the watermark with the avatar. The watermark may comprise at least one of: security preferences for the avatar, contact information for an owner of the avatar, and graphical information to cause alteration of the avatar when the avatar is recorded. The system is specific to avatars which have known and set features. The system does not identify features that are variable, such as human faces, and place a watermark to avoid the features in the image.

U.S. Pat. No. 8,243,984 discloses that video from a security camera is overlaid with small but visible indicators in each corner of the frame. The indicators may comprise an encoded value that can be decoded upon visual inspection by a user without the use of a computer. The encoded value may identify the camera such that a user knowledgeable about the format and sequence of the indicators can view the images and readily understand the identity of the security camera. In some embodiments, the indicators identify other information associated with the video such as the persons, objects, locations, conditions, times, or other data that is associated with the video. The system requires user interaction to determine the region of the digital image to obscure. The system does not discern aspects of an image and place the watermark to avoid selected regions of the image.

What is needed is an automated system and method for identifying selected features of a digital image, watermarking the entire digital image, and then reducing or eliminating the watermark on the selected feature or features in the photograph to provide an altered digital image for marketing and sales purposes. Preferably, the system would retain the original digital image in addition to the altered digital image. More preferably, the system includes feature recognition software. This feature recognition software would preferably be face recognition software. Most preferably, the face recognition software would allow for identification of faces of different sizes, shapes, skin colour, hair colour, faces with glasses, faces with sunglasses, faces with visors, faces with hats and the like.

SUMMARY

The present technology is a system including a computing device including a processor and a memory, the memory having instructions thereon to instruct the processor to autonomously identify selected features of a digital image, watermarking the entire digital image, and then reduce or eliminate the watermark on the selected feature or features in the photograph to provide an altered digital image for marketing and sales purposes. The system retains the original digital image in addition to the altered digital image. The system includes feature recognition software. This feature recognition software is face recognition software. The face recognition software allows for identification of faces of different sizes, shapes, skin colour, hair colour, faces with glasses, faces with sunglasses, faces with visors, faces with hats and the like. The method is autonomous and does not require user interaction. More specifically, it is a method of identifying a face, whether as a face or as, for example, but not limited to, a pair of glasses or a hat or a spherical object upon a torso and selectively watermarking the remainder of the digital image.

In one embodiment, a system for protecting a proprietary medium is provided, the system comprising a processor and a memory having instructions stored thereon that when executed by the processor cause the processor to: identify at least one first feature of interest in an original digital image; generate a watermarked copy of the original image and generate a masked copy of the original image in which the first feature of interest is masked; combine the watermarked copy with the masked copy to provide a modified watermarked copy having a region of lower intensity watermarking corresponding to the location of the first feature of interest in the original digital image; and overlay the modified watermarked copy over the original image to provide a final copy in which the regions of lower intensity watermarking are aligned with the first feature of interest.

In the system, the memory may have instructions thereon when executed by the processor cause the processor to: identify at least one second feature of interest in the original digital image; and apply heuristics to estimate the location of the first feature of interest before generating the masked copy of the original image in which the first feature of interest is masked.

In the system, the memory may have instructions thereon when executed by the processor cause the processor to: identify at least three first features of interest; and apply heuristics to estimate the location of one first feature of interest, based on the location of the other two first features of interest before generating the masked copy of the original image in which the one first feature of interest is masked.

In the system, the memory may have instructions thereon when executed by the processor cause the processor to: rank a plurality of features of interest to provide a ranking; and adjust the intensity or colour of the watermark of each region of a plurality of regions commensurate with the ranking.

In the system, the memory may have instructions thereon when executed by the processor cause the processor to: detect edges; learn a shape of at least one feature of interest; and generate a digital image of the shape.

In the system, the digital image of the shape of at least one feature of interest and a digital image of at least one feature of interest may be stored in a database.

In the system, the memory may have instructions thereon when executed by the processor cause the processor to: access the database; and provide an accurate mask of at least one feature of interest based on the digital image.

In the system, the memory may have instructions thereon when executed by the processor cause the processor to: find identifiers in at least one original digital image and group all the digital images having a given identifier before identifying at least one first feature of interest in the original digital image.

In the system, the proprietary medium may be a digital photograph.

In another embodiment, method for protecting a proprietary digital medium is provided, the method including: selecting a system comprising a processor and a memory, the memory have instructions thereon, which when executed by the processor cause the processor to perform the steps comprising: identifying at least one first feature of interest in an original digital image; generating a watermarked copy of the original image and generating a masked copy of the original image in which the first feature of interest is masked; combining the watermarked copy with the masked copy to provide a modified watermarked copy having a region of lower intensity watermarking corresponding to the location of the first feature of interest in the original digital image; and overlaying the modified watermarked copy over the original image to provide a final copy in which the regions of lower intensity watermarking are aligned with the first feature of interest.

The method may further comprise the processor accessing a database of features of interest and providing an accurate mask of at least one feature of interest based on a digital image of the feature of interest in the database.

The method may further comprise storing a dataset of features of interest in a database.

The method may further comprise the processor machine learning a shape of a feature of interest.

The method may further comprise ranking a plurality of features of interest to provide a ranking and adjusting the intensity or a colour of the watermark of each region of a plurality of regions of the watermark in relation to the ranking.

The method may further comprise uploading the final copy to a webpage.

In another embodiment, a method of marketing a proprietary digital medium is provide, the method comprising: selecting a system comprising a processor and a memory, the memory storing the proprietary digital medium and have instructions thereon, which when executed by the processor cause the processor to perform the steps including: providing a final copy of the proprietary digital medium, wherein the final copy includes at least one region of lower intensity watermarking which is aligned with at least one feature of interest from the proprietary digital medium and a remainder of the final copy having higher intensity watermarking, such that the remainder of the final copy is at least partially obscured; uploading the final copy to a server; and displaying the final image to a prospective purchaser.

In the method the providing the final image may comprise:
identifying the feature of interest in the proprietary digital medium; generating a watermarked copy of the proprietary digital medium and generating a masked copy of the proprietary digital medium in which the first feature of interest is masked; combining the watermarked copy with the masked copy to provide a modified watermarked copy having a region of lower intensity watermarking corresponding to the location of the feature of interest in the proprietary digital medium; and overlaying the modified watermarked copy over the original image to provide the final image.

In the method, the providing the final image may comprise the prospective purchaser utilizing Augmented Reality glasses which when focused on an area of interest, remove the watermarking.

The method may further comprise the prospective purchaser purchasing the proprietary digital image and the proprietary digital image being provided to the prospective purchaser.

FIGURES

Figure 4A:
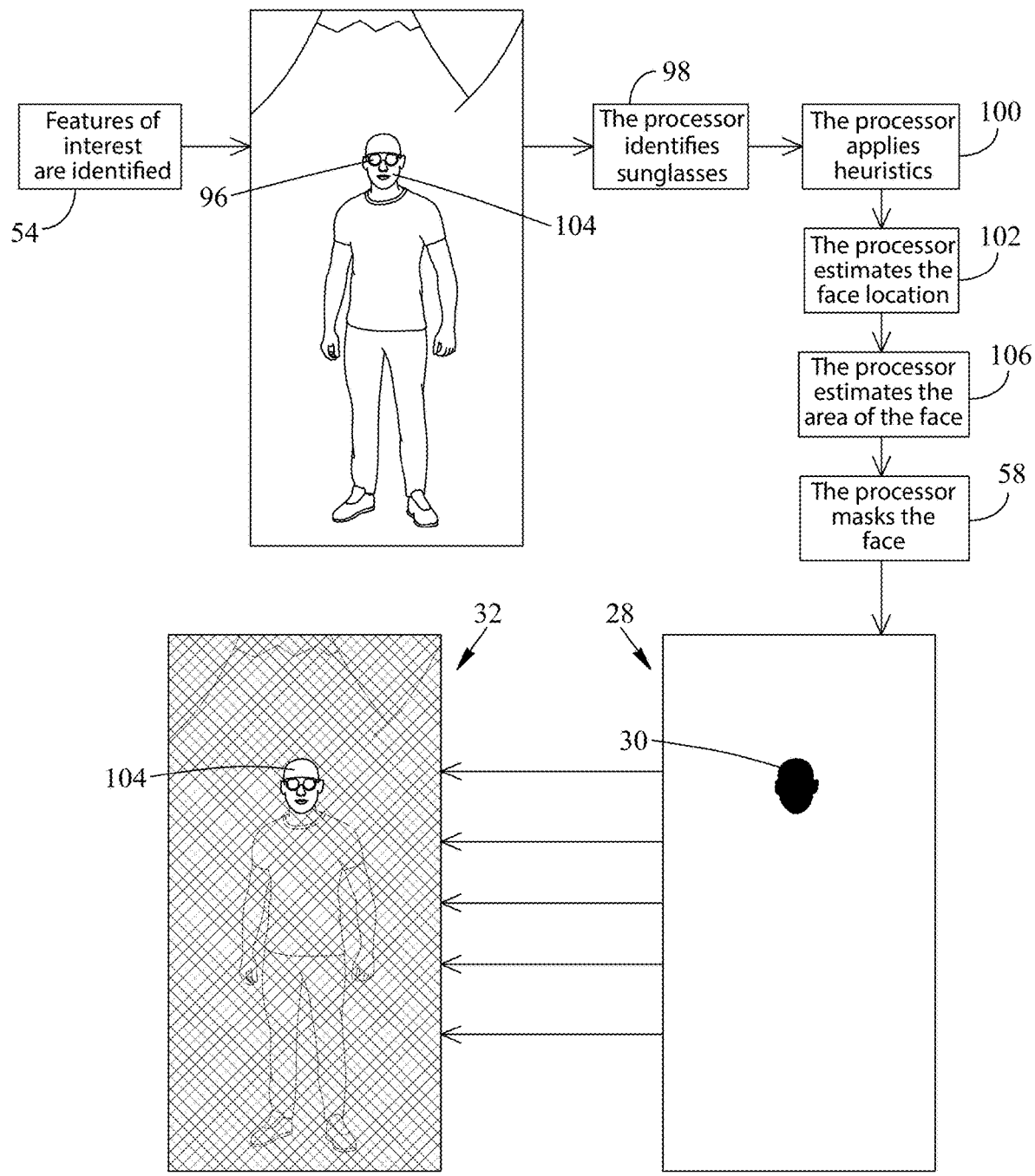
Figure 4B:
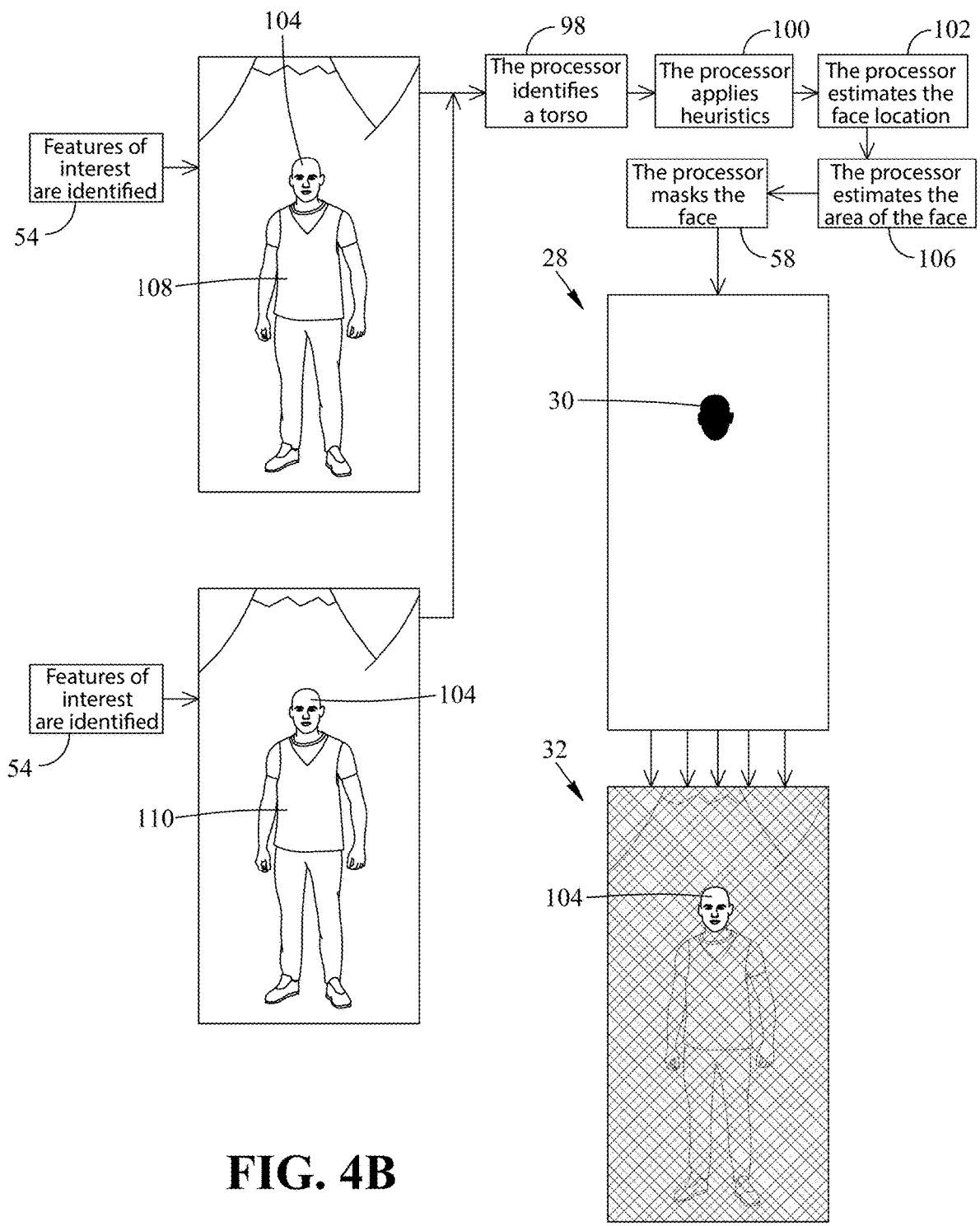
Figure 4C:
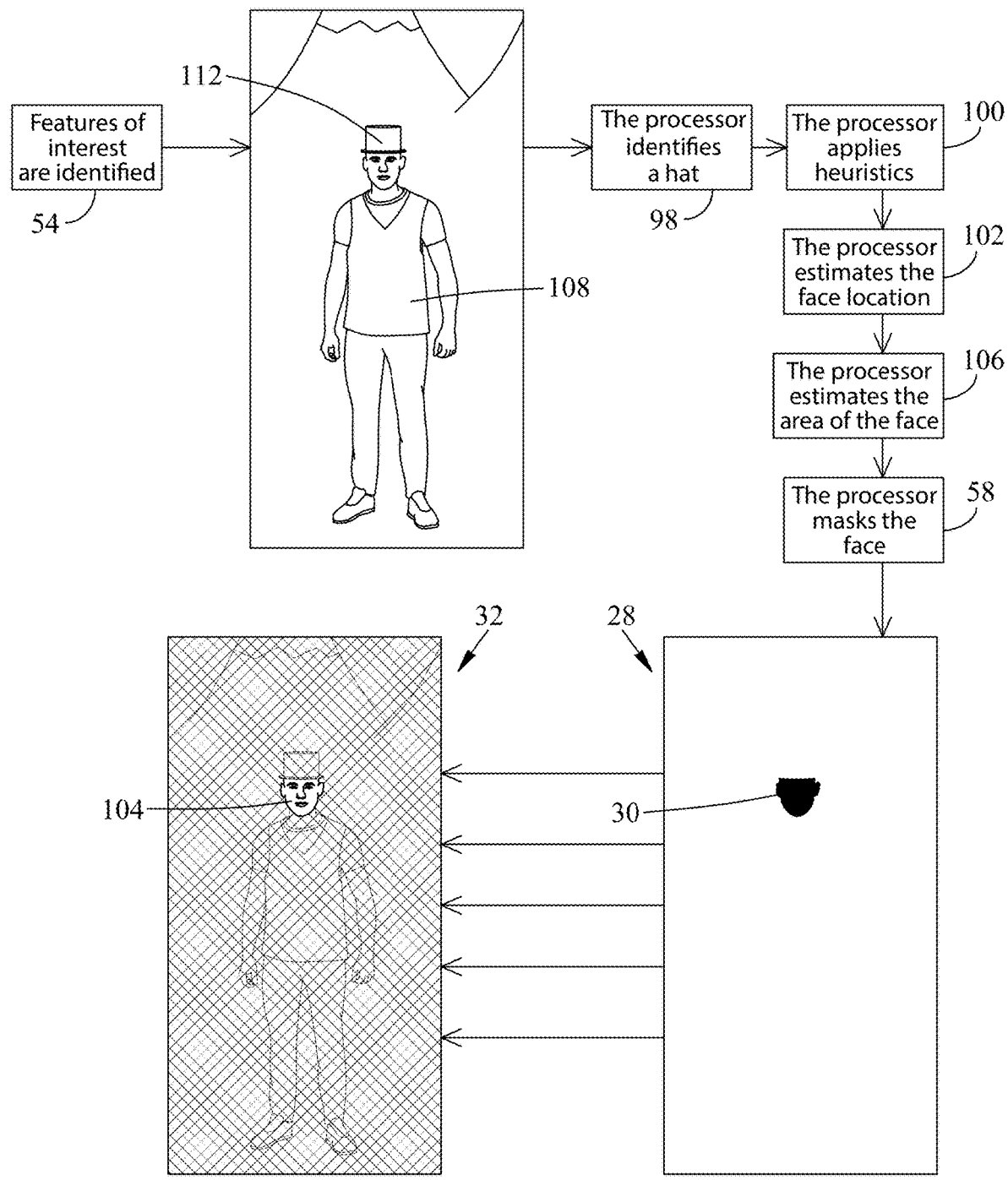
Figure 4D:
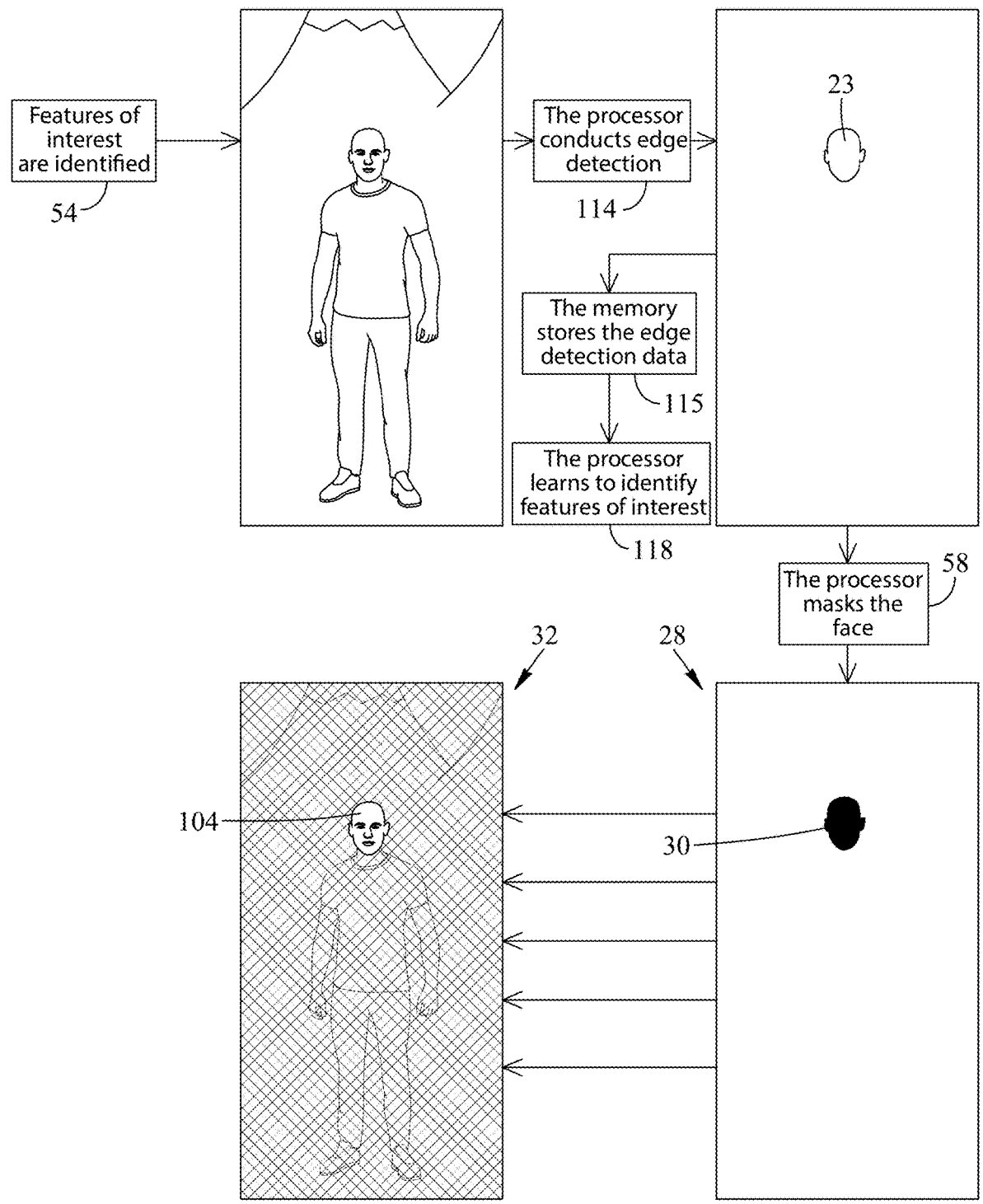

FIG. 4A is a combined block diagram and schematic of an embodiment of the method of the present technology; FIG. 4B is a combined block diagram and schematic of another embodiment of the method of the present technology; FIG. 4C is a combined block diagram and schematic of another embodiment of the method of the present technology; and FIG. 4D is a combined block diagram and schematic of another embodiment of the method of the present technology.

Figure 5:
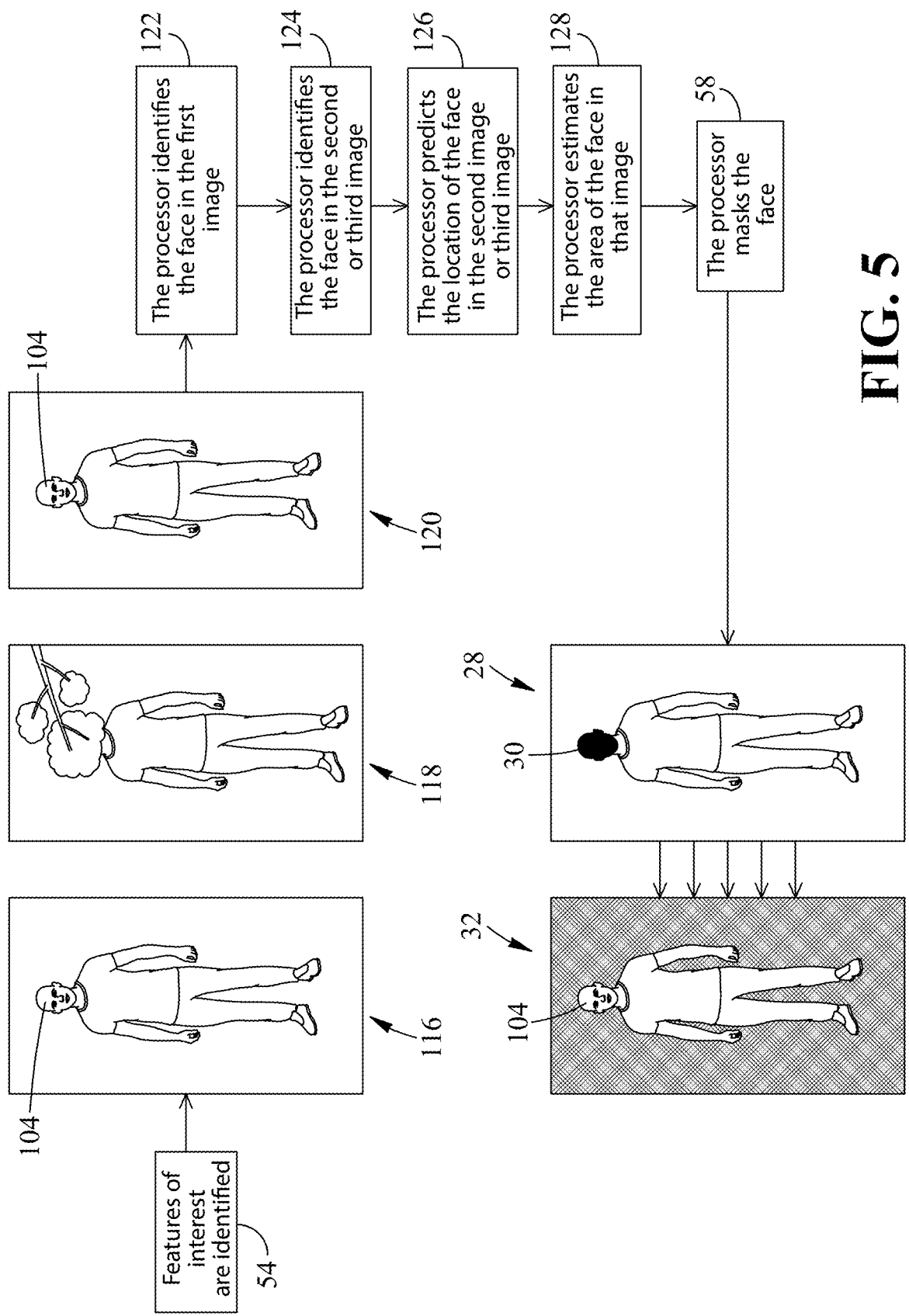

FIG. 5 is a combined block diagram and schematic of an embodiment of the method of the present technology.

Figure 6:
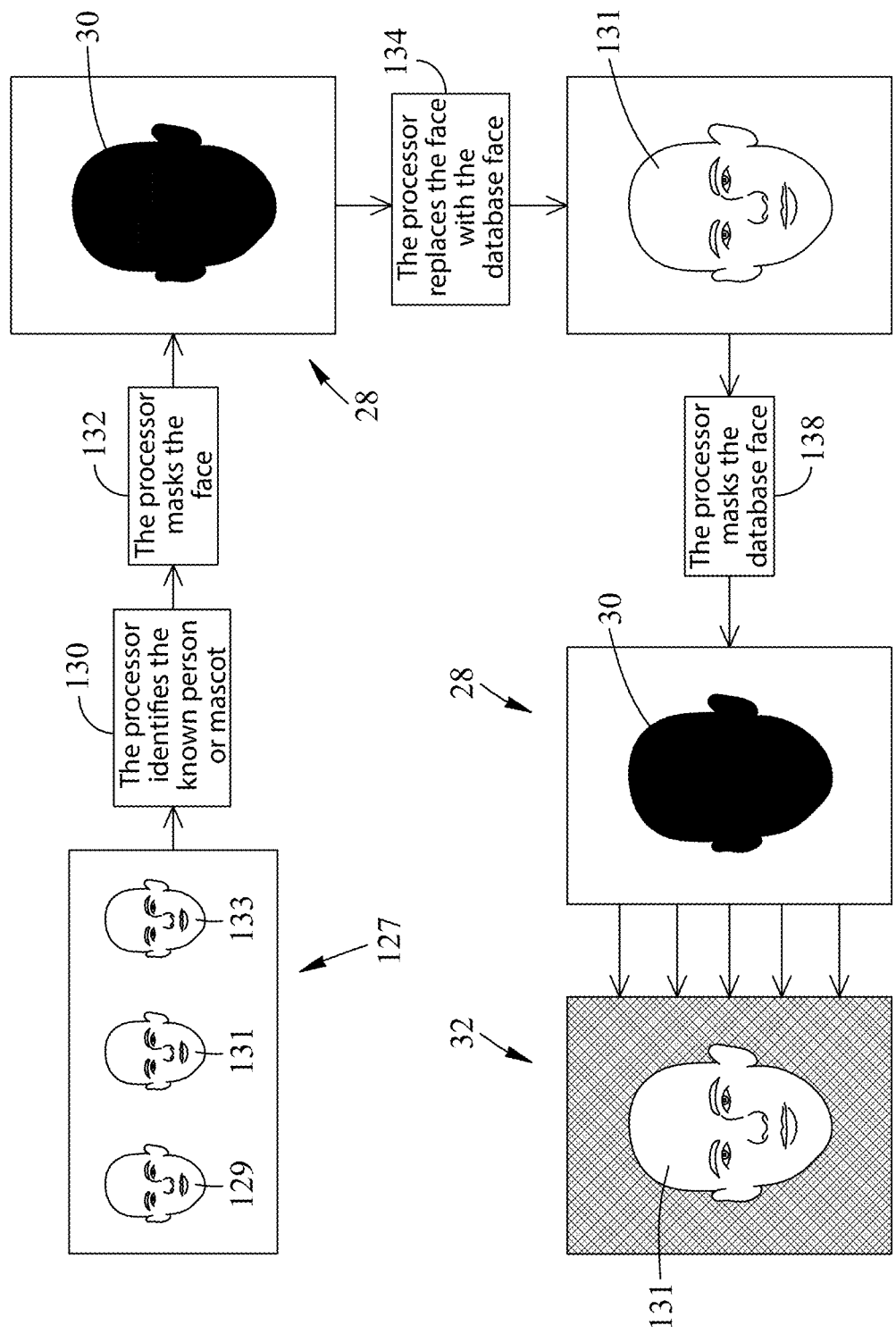

FIG. 6 is a combined block diagram and schematic of an embodiment of the method of the present technology.

Figure 7B:
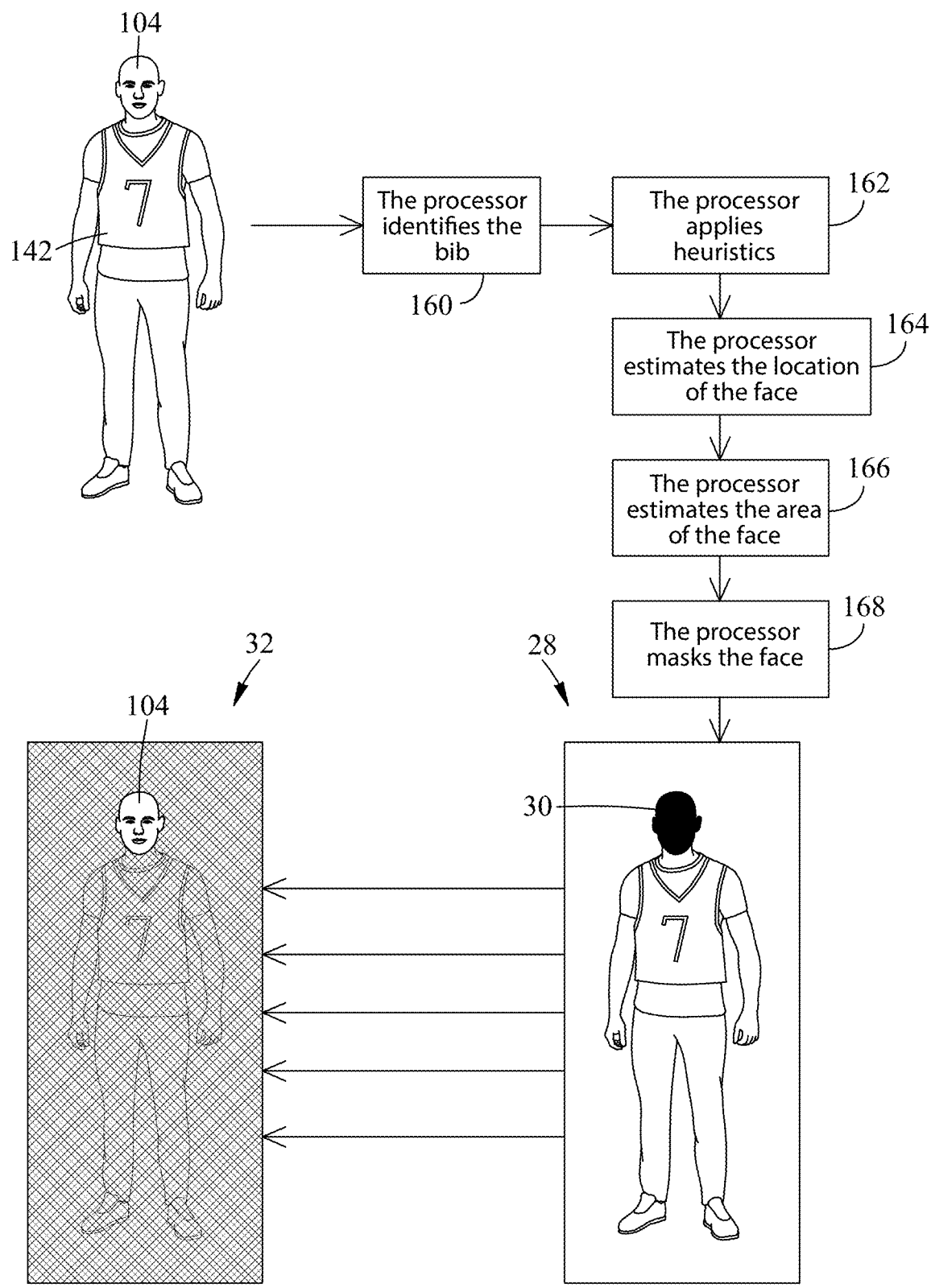
Figure 7C:
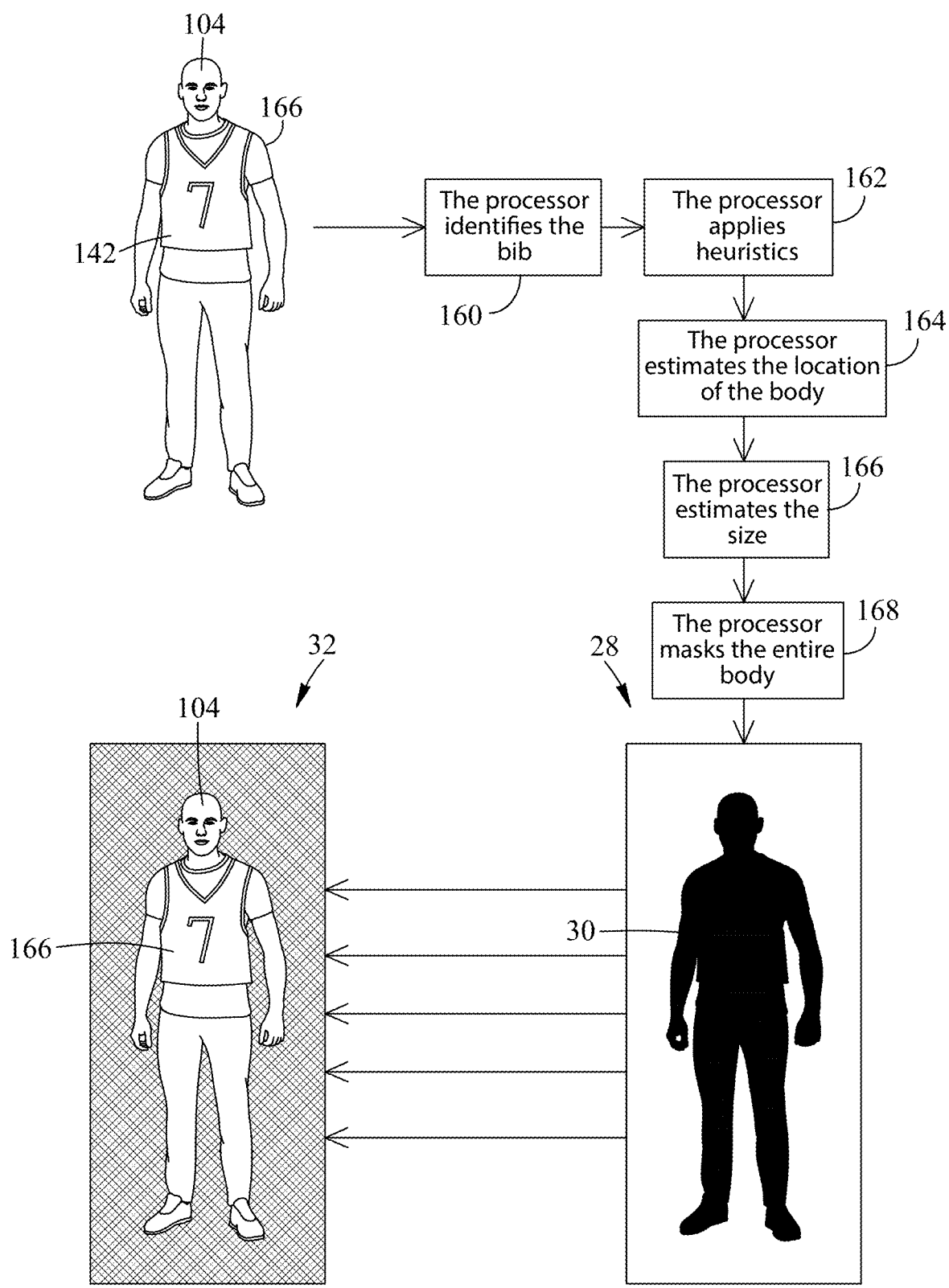
Figure 7D:
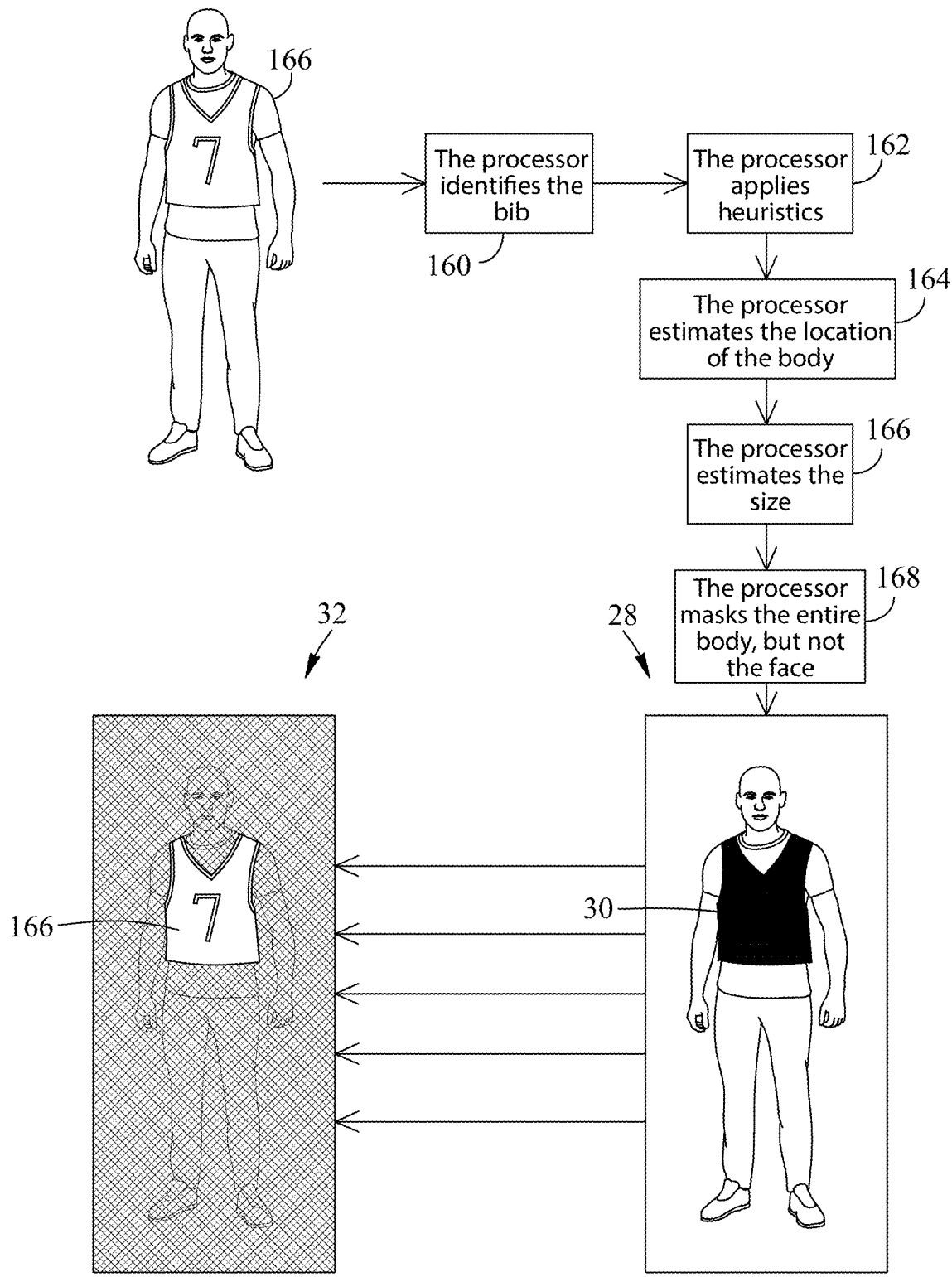

FIG. 7A is a combined block diagram and schematic of an embodiment of the method of the present technology; FIG. 7B is a combined block diagram and schematic of another embodiment of the method of the present technology; FIG. 7C is a combined block diagram and schematic of another embodiment of the method of the present technology; and FIG. 7D is a combined block diagram and schematic of another embodiment of the method of the present technology.

Figure 8A:
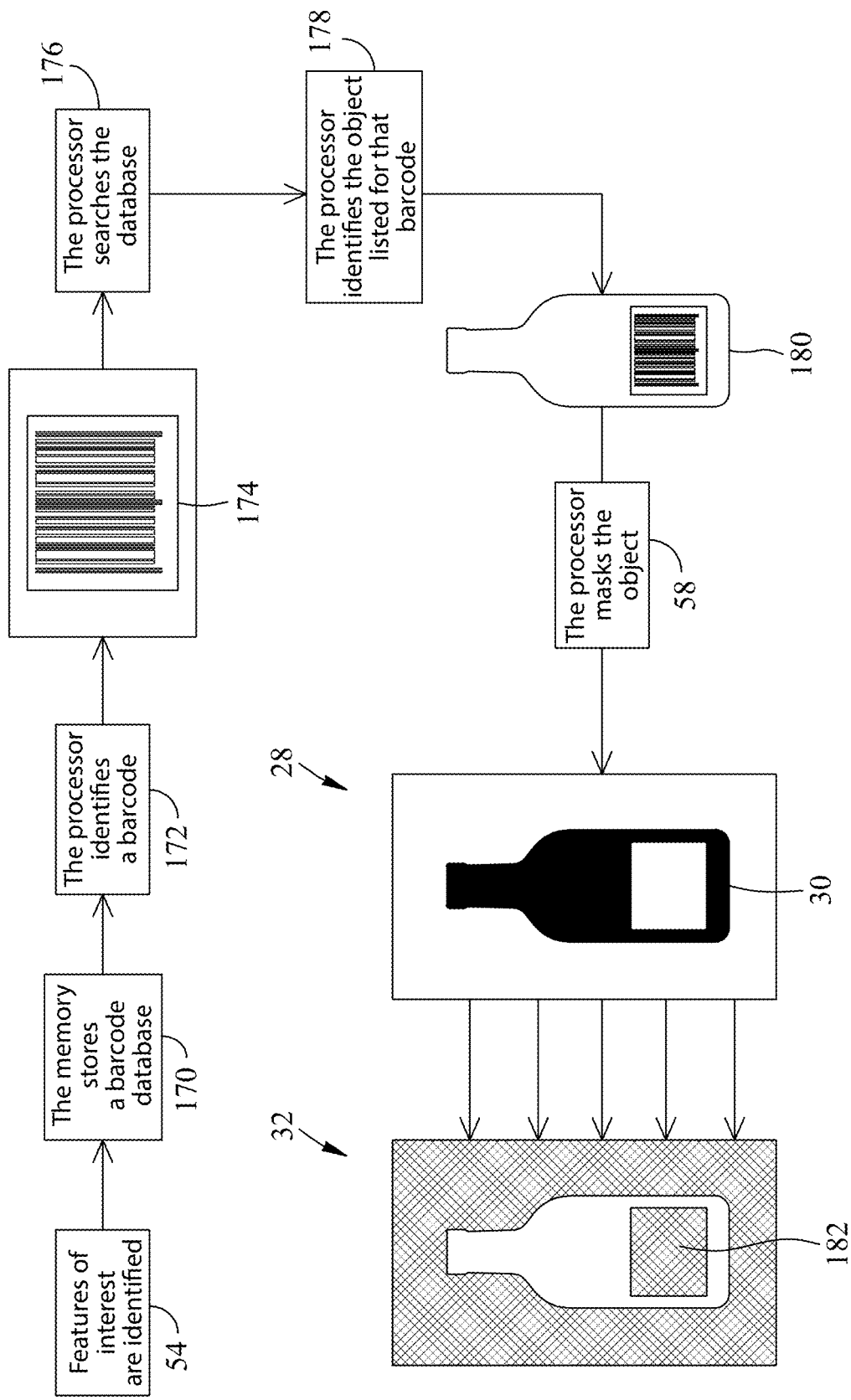
Figure 8B:
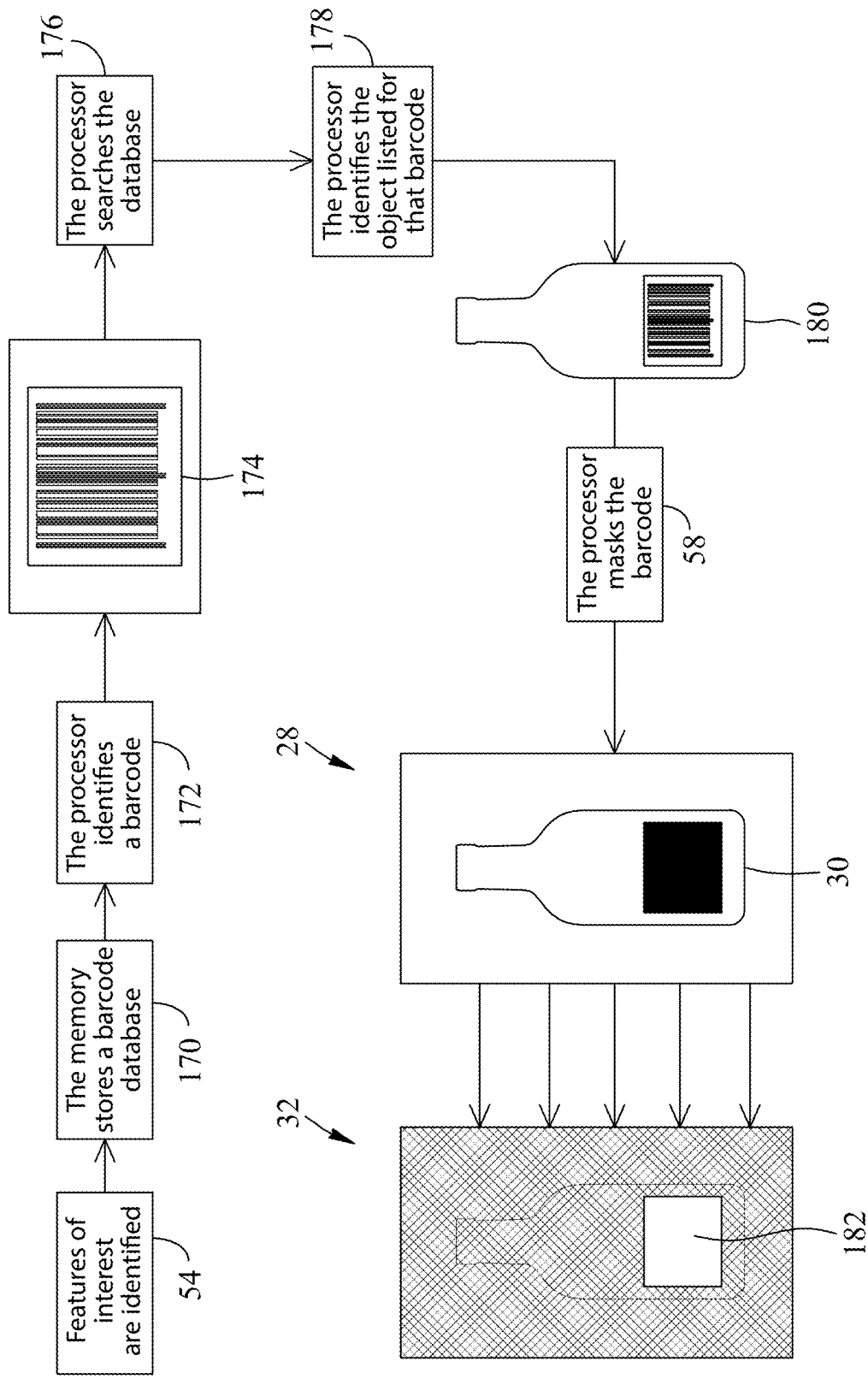

FIG. 8A is a combined block diagram and schematic of an embodiment of the method of the present technology; and FIG. 8B is a combined block diagram and schematic of another embodiment of the method of the present technology.

Figure 9:
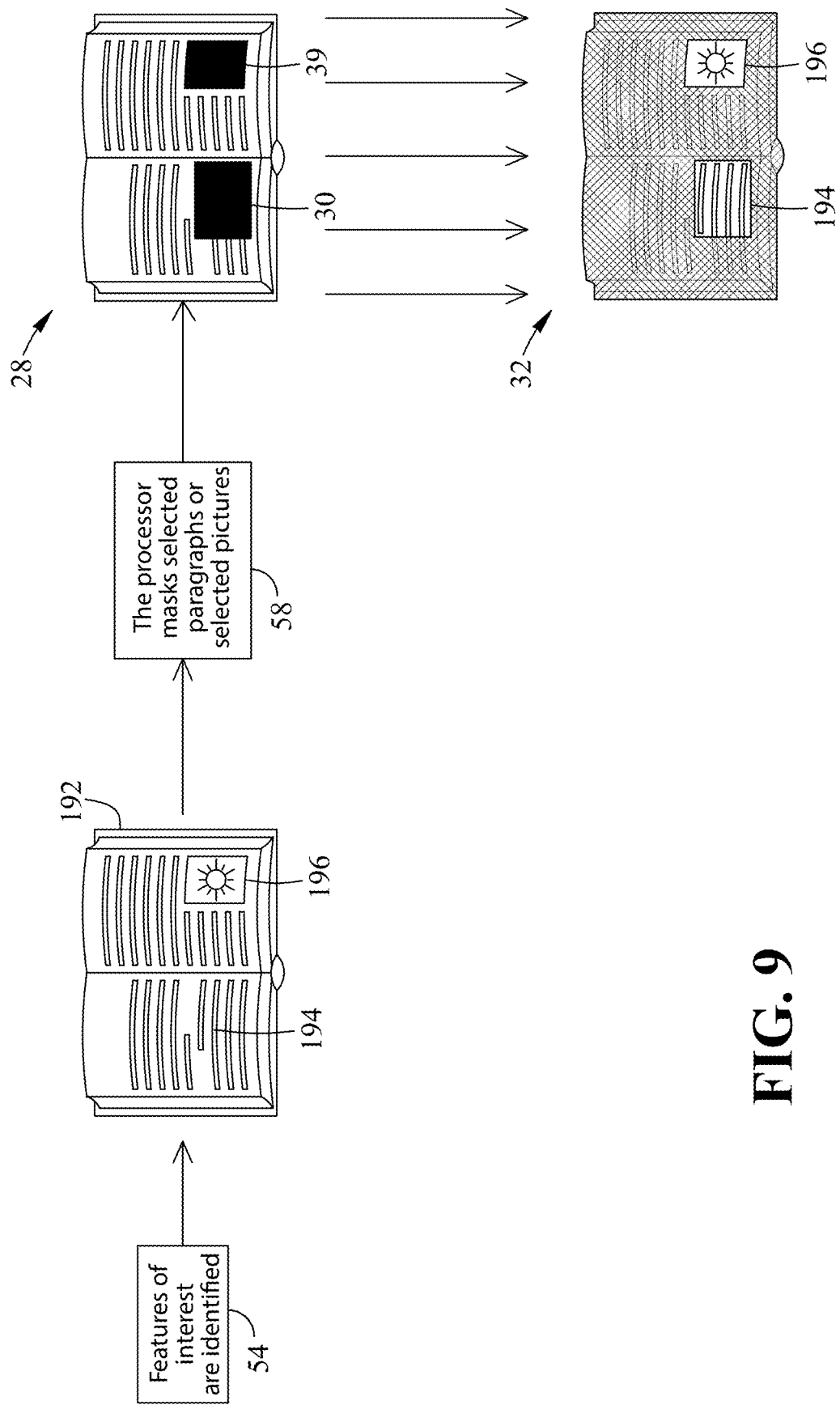

FIG. 9 is a combined block diagram and schematic of an embodiment of the method of the present technology.

Figure 10:
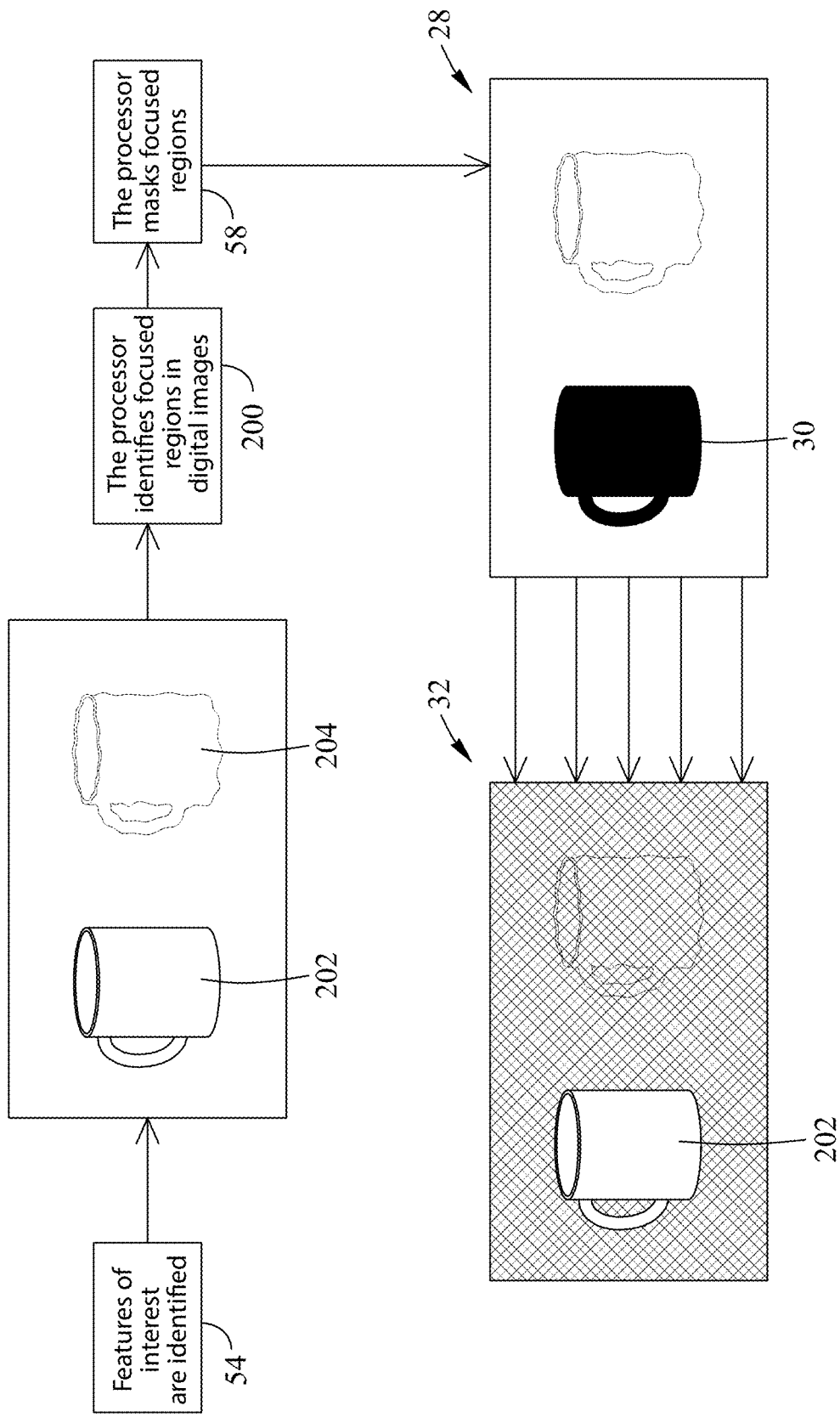

FIG. 10 is a combined block diagram and schematic of an embodiment of the method of the present technology.

Figure 11:
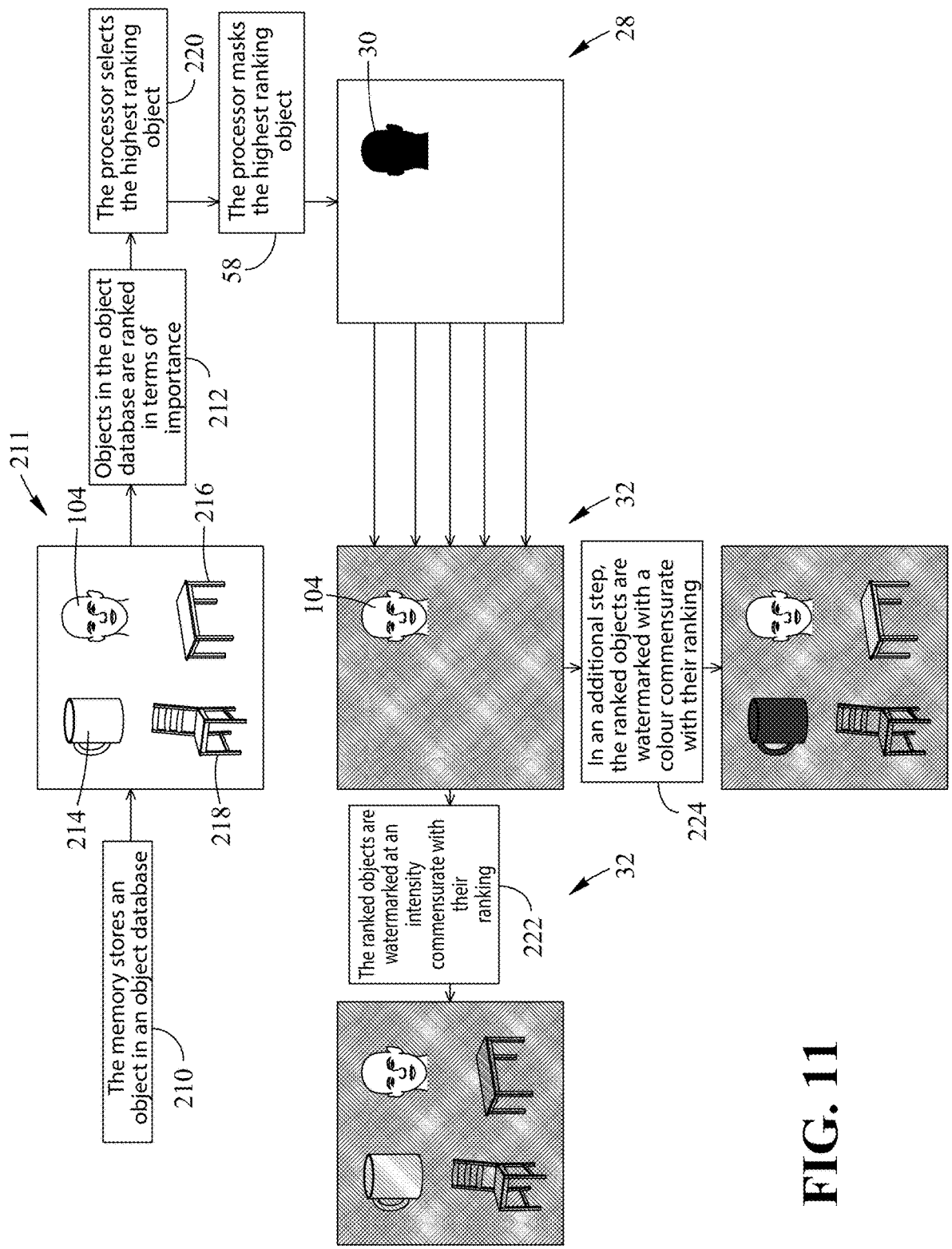

FIG. 11 is a combined block diagram and schematic of an embodiment of the method of the present technology.

Figure 12:
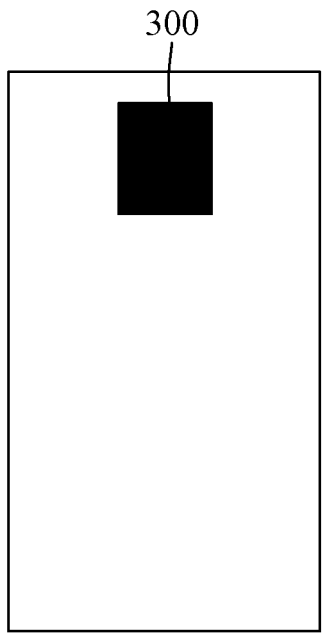
Figure 12:
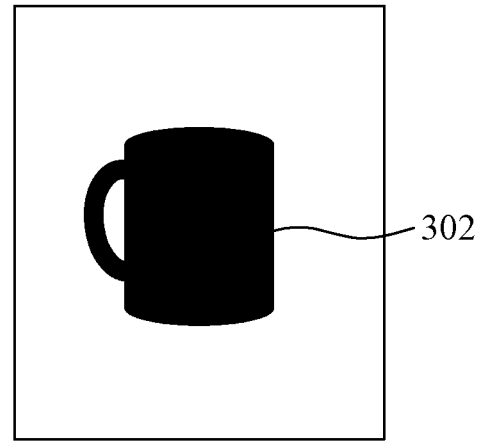
Figure 12:
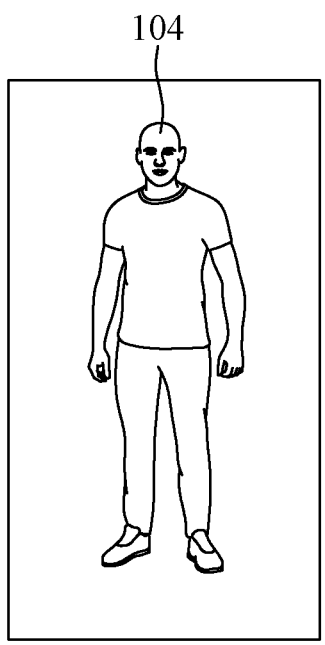
Figure 12:
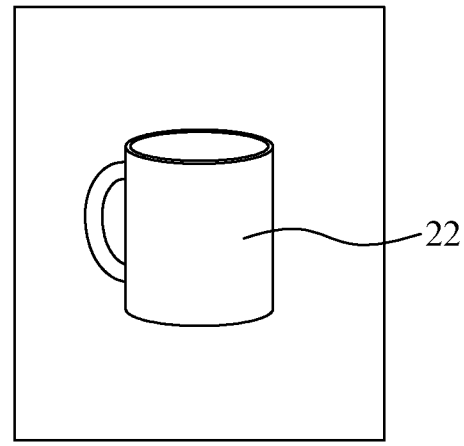

FIG. 12 is a schematic showing accurate and inaccurate masking.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
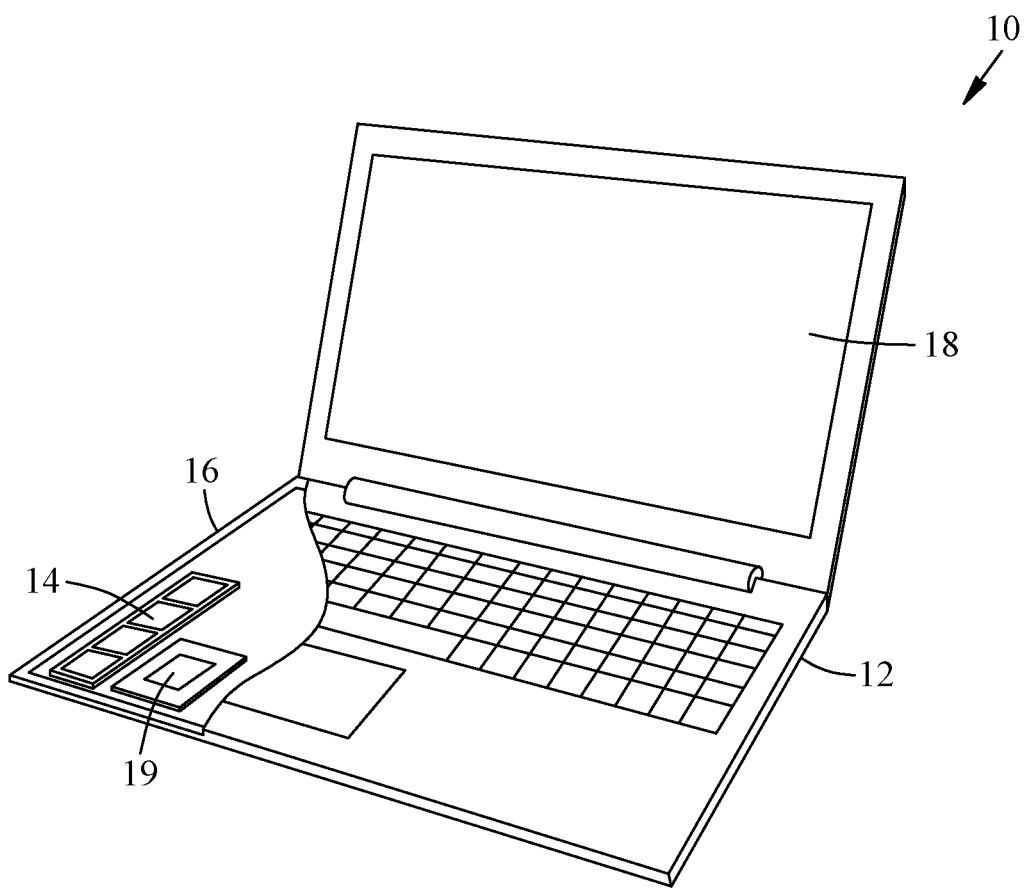
FIG. 1 is a schematic of the system of the present technology.

A system, generally referred to as 10 is shown in FIG. 1. It includes a computing device 12, with a processor 14, a memory 16, with instructions thereon to instruct the processor 14 to execute steps and including digital image modification software 19, and a user interface/display 18. The memory 16 includes a content aware watermarking algorithm, that is configured to detect features and to remove or alter the opacity, intensity, colour, or design of a watermark, based on the contents of the digital image.

Figure 2:
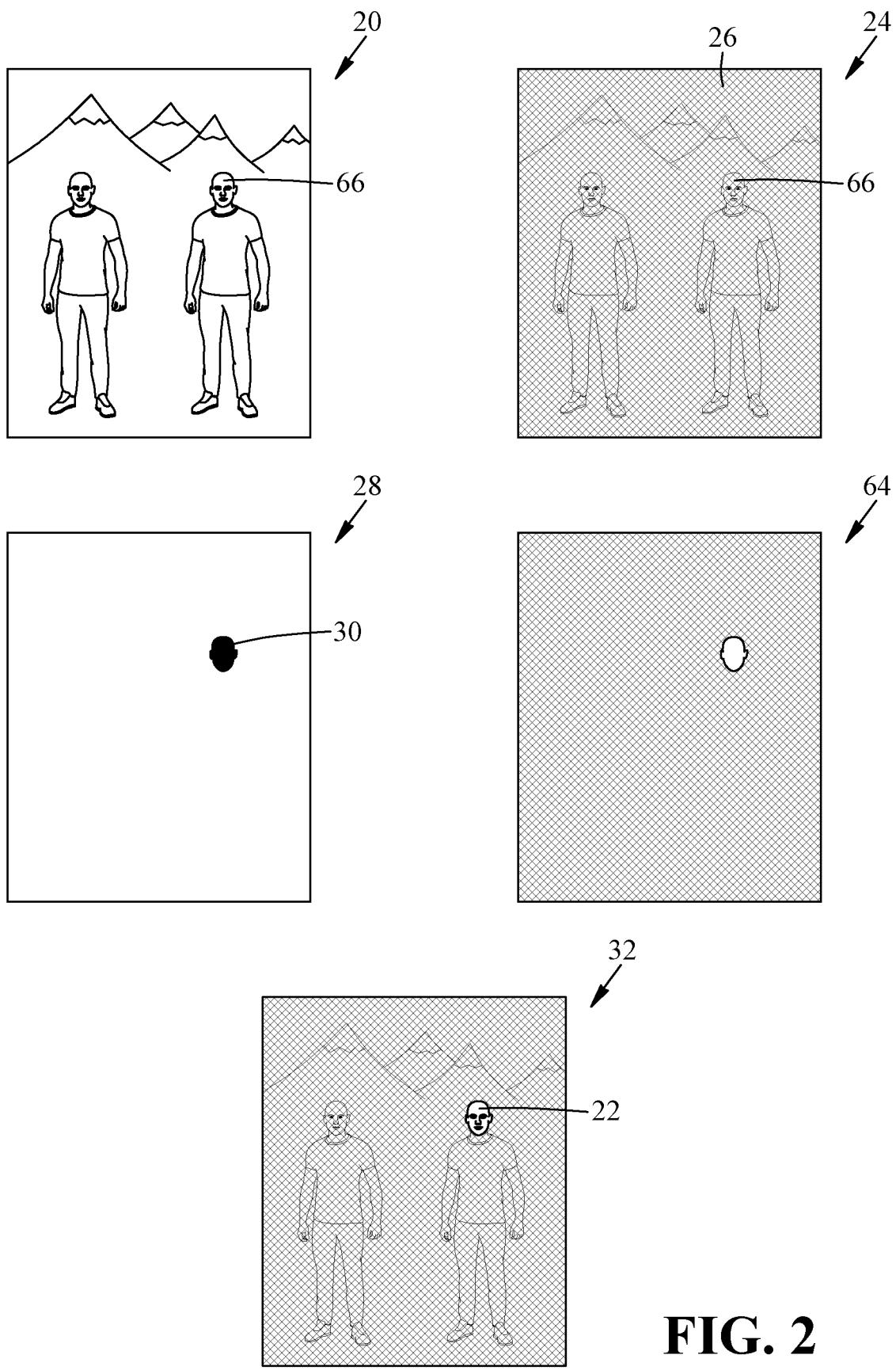
FIG. 2 is a schematic showing the images and copies of the present technology.

As shown in FIG. 2, there is an original digital image 20 with features of interest 22, a watermarked digital image 24, which may be a tiled watermark 26, a masked digital image 28, with masks 30, a modified watermarked digital image 64 and a final digital image 32, with at least one feature of interest 22 and the tiled watermark 26. The tiled watermark may be a logo, a name, a trademark or the like. In an alternative embodiment, the watermarked digital image, the masked digital image and the final digital images are electronic copies which may or may not be displayed as digital images until needed as such.

Figure 3:
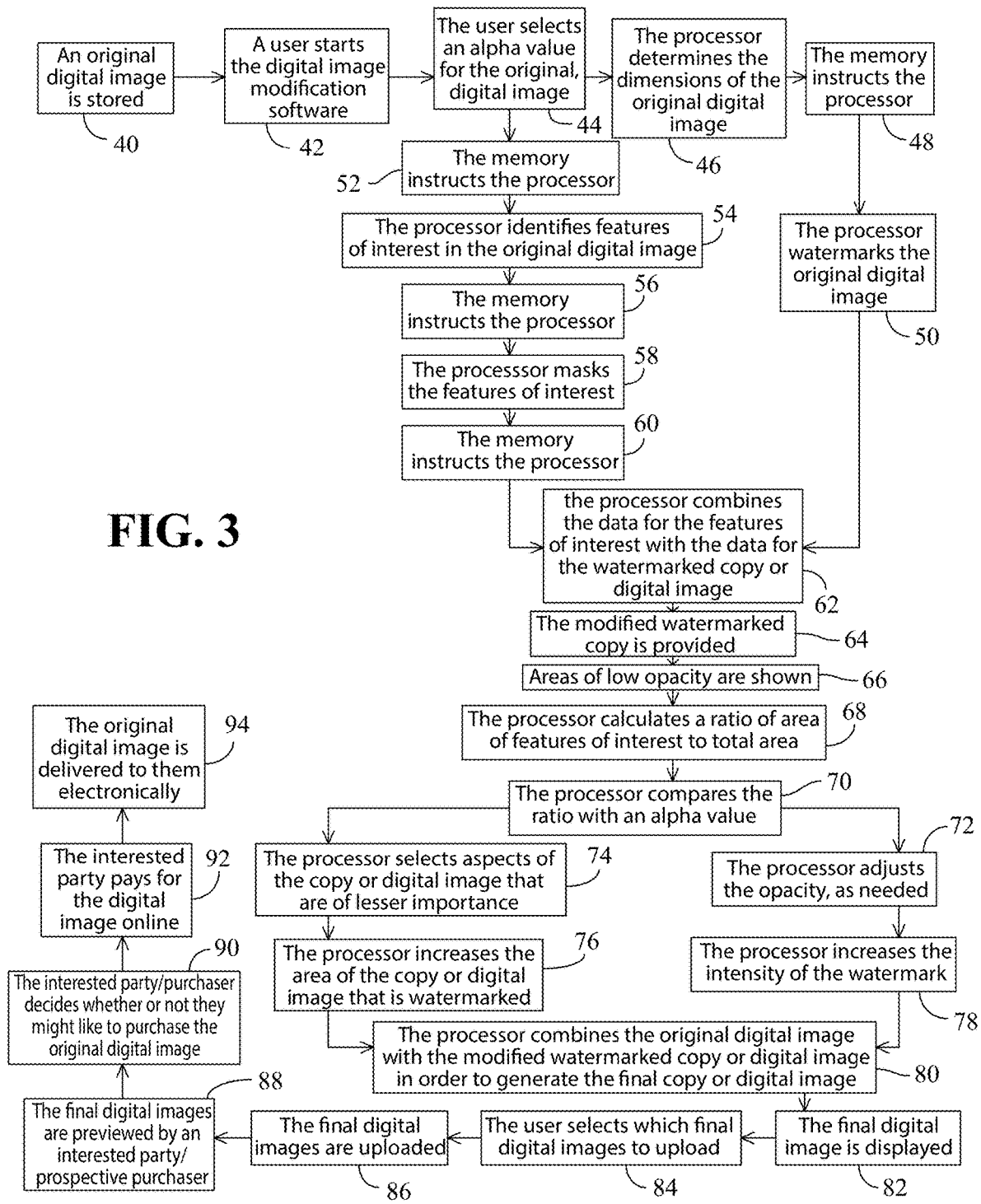
FIG. 3 is a block diagram of the steps of the method of the present technology.

As shown in FIG. 3, an original digital image 20 is stored 40 in the memory 16. A user starts 42 the digital image modification software 19. The user selects 44 an alpha value for the original, digital image 20. Thereafter, the computing device autonomously conducts the image processing. The memory instructs the processor to determine 46 the dimensions of the original digital image. The memory 16 instructs 48 the processor 14 to watermark 50 by generating or pasting or adding a watermark 51 to all or at least a portion of the original digital image 20, such that enough of the digital image is obscured to render it unsaleable. This is the watermarked copy or digital image 22. The memory 16 also instructs 52 the processor 14 to identify 54 features of interest 22 in the original digital image 20, using in one embodiment, face recognition software and then instructs 56 the processor 14 to mask 58 the features of interest 22 to provide the masked copy or digital image 28. Masking 58 is done by generating or pasting or adding a mask 30 over each feature of interest 22. Generation of the watermarked copy or digital image 24 may be before, at the same time or after the masked copy or digital image 28 is generated. At this stage, there are three digital images, the original digital image 20, the watermarked digital image 24 and the masked digital image 28, or one digital image and two copies, the watermarked copy 24 and the masked copy 28 or. The memory 16 then instructs 60 the processor 14 to combine 62 the data for the features of interest 22 with the data for the watermarked copy or digital image 24, in other words, overlay the masked copy or digital image 28 on the watermarked copy or digital image 24. This results in a modified watermarked copy or digital image 64 which has areas 66 of lower opacity that are in the same location as the features of interest 22 and hence will align with the features of interest 22.

The memory 16 instructs the processor 14 to calculate 68 a ratio of area of features of interest to total area for the watermarked copy or digital image 22. The memory 16 instructs the processor 14 to compare 70 the ratio with an alpha value. If the ratio is too high, the processor 14 will adjust 72 the opacity. Alternatively or also, the processor 14, upon receiving instructions from the memory, will also select 74 aspects of the copy or digital image that are of lesser importance, for example, but not limited to, faces that are further away in the copy or digital image, faces that are partially obscured by other features in the digital image, for example, but not limited to, another person, a tree, or a shadow, faces on heads that are turned from the camera, and the like. The memory instructs the processor to increase 76 the area of the copy or digital image that is watermarked by watermarking parts of the digital image that are of lesser important. As an alternative to selecting 74 aspects that are of lesser importance and watermarking them, the memory may instruct the processor to increase 78 the intensity of the watermark, thereby obscuring more of the digital image, for example, but not limited to, the bodies associated with the faces.

Once the ratio is in range, the memory 16 instructs the processor to combine 80 the original digital image 20 with the modified watermarked copy or digital image 64, in order to generate the final copy or digital image 32. The final digital image 32 is displayed 82 on the display 18. The user selects 84 which final digital images 32 to upload to a server and the final digital images 32 are uploaded 86 and displayed through a webpage on an interface or is displayed on another digital display. The final digital images 26 can then be previewed 88 by an interested party/prospective purchaser. They will be able to see the regions of interest in the final digital image, for example, their face, thus allowing them to decide 90 whether or not they might like to purchase the original digital image 20. As much of the final digital image 32 is watermarked, it is unlikely that the interested party will steal the final digital image. If the interested party wishes to purchase the original digital image, they pay 92 for the digital image online and the original digital image is delivered 94 to them electronically.

As shown in FIG. 4A, the memory 16 includes association software that provides additional capabilities to the method of FIG. 3. At the step of identifying 54 features of interest, the memory is configured to instruct the processor to identify 98 sunglasses 96 and to apply 100 heuristics in order to estimate 102 the location of the face 104 and estimate 106 the area of the face, based on the area of the sunglasses 100. The processor, under instructions from the memory then masks 58 the face 104 and the method continues as described above for FIG. 3. The final product is a final digital image 32 showing the face but watermarked in the remainder of the digital image.

As shown in FIG. 4B, at the step of identifying 54 features of interest, the memory is configured to instruct the processor to identify 98 a torso 108 and to apply 100 heuristics to estimate 102 the location of the face 104 and estimate 106 the area of the face. The processor, under control of the memory, then masks 58 the face 104 and the method continues as described in relation to FIG. 3. The result is a final digital image 32 showing the face and obscuring the remainder of the digital image with a watermark or watermarks. The memory may be further configured to instruct the processor to identify only torsos wearing specific clothing 110, for example, but not limited to life preservers, red jackets, ski jackets or safety vests.

As shown in FIG. 4C, at the step of identifying 54 features of interest, the memory is configured to instruct the processor to identify 98 a hat 112 and to apply 100 heuristics to estimate 102 the location of the face 104 and estimate 106 the area of the face. The processor, under control of the memory, then masks 58 the face 104 and the method continues as described in relation to FIG. 3. The result is a final digital image 32 showing the face and obscuring the remainder of the digital image with a watermark or watermarks.

As shown in FIG. 4D at the step of identifying 54 features of interest, the memory, which includes edge detection software, is configured to instruct the processor to conduct edge detection 114 on the feature of interest to produce an outline 23 of the feature. The processor, under control of the memory, then masks 58 the face 104 based on the edges detected to provide a highly accurate mask and the method continues as described in relation to FIG. 3. The result is a final digital image 32 showing the face and obscuring the remainder of the digital image with a watermark or watermarks. The memory stores 115 the edge detection data. The memory further instructs the processor to learn 118 to identify features of interest 22, using the edge detection data.

As shown in FIG. 5, the memory includes prediction software that provides additional capabilities to the method of FIG. 3. At the step of identifying 54 features of interest, in a temporal sequence of digital images 116, 118, 120, a face can be seen in a first image 116 and in either a second image 118 or a third image 120, but not both (or any other combination of the three images, with one image missing the face). The memory is configured to instruct the processor to identify 122 the face 104 in the first image 116 and to identify 124 the face 104 in the second image 118 or the third image 120. The memory is configured to instruct the processor to then predict 126 the location of the face 104 in the second image 118 or the third image 120 and to estimate 128 the area of the face in that image. The processor, under control of the memory, then masks 58 the face 104 and the method continues as described in relation to FIG. 3. The result is a final digital image 32 showing the face and obscuring the remainder of the digital image with a watermark or watermarks.

As shown in FIG. 6 the memory stores a database 127 of faces 129, 131, 133 of known people or mascots. The memory is configured to instruct the processor to identify 130 the known person or mascot. The processor under control of the memory masks 132 the face 104 and replaces 134 it with the database face 131. The processor under control of the memory then masks 138 the database face 136 and the method continues the method continues as described in relation to FIG. 3. The result is a final digital image 32 showing the replacement face 126 and obscuring the remainder of the digital image with a watermark or watermarks.

As shown in FIG. 7A the memory is configured to instruct the processor to analyze 140 the digital images to find identifiers 142, for example, but not limited to a bib number or a team player number and the like. The memory instructs the processor to group 144 all the digital images having a given identifier 142. The memory instructs the processor to collate 146 the data to provide a listing of each bib number 142 with all the digital images in which that bib number appears. The processor has, under control of the memory masked 58 the face 104 in all the digital images and the method has continued as described in relation to FIG. 3. The result are final digital images 32 showing the face and obscuring the remainder of the digital image with a watermark or watermarks. A highly obscuring watermark is used so that no other runners can be seen in the digital image. The processor under control of the memory then uploads 148 the resultant dataset 150 onto the webpage. An interested party, for example, the runner who wore bib 10, searches 152 the dataset for the numbers of the digital images in which they appear. Alternatively, the interested party may first search 154 the database for their bib number. If they select to view the digital images associated with their bib number, those digital images are watermarked 156.

An additional aspect of this method is shown in FIG. 7B. At the step of identifying 54 features of interest, the memory is configured instruct the processor to identify 160 the bib 142 and apply 162 heuristics to estimate 164 the location of the face 104 and estimate 166 the area of the face. The processor, under control of the memory then masks 168 the face and the method continues as described in relation to FIG. 3. The result is a final digital image 32 showing the face and obscuring the remainder of the digital image with a watermark or watermarks. A highly obscuring watermark is used so that no other runners can be seen in the digital image.

Alternatively, as shown in FIG. 7C, the memory is configured instruct the processor to identify 160 the bib and apply heuristics 162 to estimate 164 the location and size of the body 166. The processor, under control of the memory, then masks 58 the entire body 166 and the method continues as described in relation to FIG. 3. The result is a final digital image 32 showing the body and obscuring the remainder of the digital image with a watermark or watermarks. A highly obscuring watermark is used so that no other runners can be seen in the digital image.

Another alternative is shown in FIG. 7D, the memory is configured instruct the processor to identify 160 the bib and apply heuristics 162 to estimate 164 the location and size of the body 166. The processor, under control of the memory, then masks 58 the body, but not the face 104 and the method continues as described in relation to FIG. 3. The result is a final digital image 32 showing the body, but not the face and obscuring the remainder of the digital image with a watermark or watermarks. A highly obscuring watermark is used so that no other runners can be seen in the digital image.

As shown in FIG. 8A, the memory stores 170 a barcode database. At the step of identifying 54 features of interest, the memory is configured to instruct the processor to identify 172 a barcode 174. The processor, under control of the memory then searches 176 the database and identifies 178 the object 180 listed for that barcode. Using the characteristics of the object, the processor, under control of the memory, then masks 58 the object 180 and the method continues as described in relation to FIG. 3. The result is a final digital image 32 showing the object and watermarking 182 the barcode. This is useful in assembly lines and for movement of products, such as agricultural products across borders.

As shown in FIG. 8B, at the step of identify 54 features of interest, the memory is configured to instruct the processor to identify 172 a barcode 174. The processor, under control of the memory, then masks 58 the barcode 174 and the method continues, such that that the object 180 is watermarked 182. This is useful in assembly lines and for movement of products, such as agricultural products across borders.

As shown in FIG. 9, at the step of identifying 54 features of interest, the memory is configured to instruct the processor to identify 190 specific features of a book 192, for example every paragraph 194 that includes a character's name, or every picture 196 that includes a chosen character. The processor, under control of the memory, then masks 58 the selected paragraphs 194 or selected pictures 196 and the method continues as described in relation to FIG. 3. The result is a final digital image 32 showing only the paragraphs or the pictures that include the character.

Other features can be identified and masked, for example, but not limited to landmarks, coffee cups, beer mugs, dogs. Further, features can be identified and, as described in relation to FIG. 8A, a reverse watermarking is done, such that the features are watermarked. Examples of include, but are not limited to credit cards, social insurance cards, nudity and prototypes. Further, faces of celebrities can be reverse watermarked.

As shown in FIG. 10, at the step of identifying 54 features of interest, the memory is configured to instruct the processor to identify 200 focused regions 202 in digital images that include unfocused regions 204. The processor, under control of the memory. then masks 58 the regions in focus 202 and the method continues as described in relation to FIG. 3, such that only the regions in focus can be seen and the remainder of the digital image is obscured by tiled watermarks.

As shown in FIG. 11, the memory stores 210 an object database 211. Objects in the object database are ranked 212 in terms of their importance, for example, faces 104 are more important than coffee mugs 214, and coffee mugs 214 are more important than tables 216, and tables 216 are more important than chairs 218. At the step of identifying features of interest, the memory instructs the processor to select 220 the highest ranking object. The processor, under control of the memory, then masks 58 the highest ranking object and the method continues as described in relation to FIG. 3, such that only the highest ranking object is seen and the remainder of the image is watermarked. In an additional step, the ranked objects are watermarked 222 at an intensity commensurate with their ranking. Additionally, if there is a region of overlap, the watermarking is based on the ranking of the objects in the overlap region—the region may be watermarked more intensely or the watermark may be lighter. Alternatively, the area of the overlap region is considered, and if the area is large in relation to the digital image, the watermarking will be less intense. Additionally, the size of the object can be used to rank the objects.

In an additional step, the ranked objects are watermarked 256 with a colour commensurate with their ranking. For example, the chairs 218 are watermarked with a white watermark, as the chairs are white. The tables 216, which are also white, are watermarked with a colour that allows some definition of the tables, for example, gray. The coffee mugs 214, which are gray, are watermarked with a colour that allows more definition of the coffee mugs than is seen for the tables.

The opacity of the watermarking may also be dependent upon the display medium. In-store advertising on electronic displays, for example, is lightly watermarked and public website are heavily watermarked. Note that the digital medium may be static, as in digital images in photographs, or may be digital images in videos or other forms of data streaming.

As shown in FIG. 12, the accuracy of masking 58 the features of interest 22 can range from low to high. A low accuracy mask 300 may be a geometric shape, for example, but not limited to a rectangle, a circle or an ellipse to mask, for example a face 104. A high accuracy mask 302 may be the shape of the feature of interest 22. High accuracy masks 302 are generated when there is a database of the features of interest. High accuracy masks 302 are also generated when the memory is configured to instruct the processor to conduct edge detection and through machine learning, identify shapes and sizes of features of interest, which are then stored in a database.

In all cases, the intensity of the watermark can be varied, depending on the audience, the content of the digital image, and the ease of accessibility to the digital images. In all cases, the intensity of the watermark may be different in different regions of the digital image. For example, in digital images of a canoe trip, it may be preferable to have the canoe selected as a highly ranked image to provide a final digital image in which the faces of the participants are shown, the canoe is lightly watermarked and the remainder of the digital image is highly watermarked, such that the other features of the digital image are completely obscured. The number of ranking and the commensurate differences in watermarking may be relatively small or may be relatively high. For example, in a digital image of a rock climbing trip, the face of one participant, who can be identified by the colour of their harness, will be clearly seen. The body of the belayer will be totally obscured. The rope will be partially obscured. The face being climbed will be obscured more than the rope, or vice versa. Similarly, the watermark may be laid over the digital image in a number of different colours that relate to the ranking of the objects in the digital image. The rule of thirds can also be applied.

Other applications of the technology include Virtual Reality/Augmented Reality (VR/AR), whereby AR glasses, for example, Microsoft® HoloLens™ will indicate that you are looking at a watermarked picture and will display the unwatermarked on your display. This can be specific to part of the digital image or can be the entire digital image.

Another application is watermarking of videos, movies or other streaming data that are not yet released to the public. Watermarking of the digital images allows a viewer to see only parts of the video, movie or streaming data. Movie.

Another application is watermarking to protect physical art. The art has a plexiglass or glass shield in front or around it. The shield is etched to provide watermarking to obscure parts of the art.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A system for protecting a proprietary medium, the system comprising a processor and a memory having instructions stored thereon that when executed by the processor cause the processor to: identify at least one first feature of interest in an original digital image; generate a watermarked copy of the original image and generate a masked copy of the original image in which the first feature of interest is masked; combine the watermarked copy with the masked copy to provide a modified watermarked copy having a region of lower intensity watermarking corresponding to the location of the first feature of interest in the original digital image; and overlay the modified watermarked copy over the original image to provide a final copy in which the regions of lower intensity watermarking are aligned with the first feature of interest.

2. The system of claim 1, wherein the memory has instructions thereon when executed by the processor cause the processor to: identify at least one second feature of interest in the original digital image; and apply heuristics to estimate the location of the first feature of interest before generating the masked copy of the original image in which the first feature of interest is masked.

3. The system of claim 1, wherein the memory has instructions thereon when executed by the processor cause the processor to: identify at least three first features of interest; and apply heuristics to estimate the location of one first feature of interest, based on the location of the other two first features of interest before generating the masked copy of the original image in which the one first feature of interest is masked.

4. The system of claim 1, wherein the memory has instructions thereon when executed by the processor cause the processor to: rank a plurality of features of interest to provide a ranking; and adjust the intensity or colour of the watermark of each region of a plurality of regions commensurate with the ranking.

5. The system of claim 1, wherein the memory has instructions thereon when executed by the processor cause the processor to: detect edges; learn a shape of at least one feature of interest; and generate a digital image of the shape.

6. The system of claim 5, wherein the digital image of the shape of at least one feature of interest and a digital image of at least one feature of interest are stored in a database.

7. The system of claim 5, wherein the memory has instructions thereon when executed by the processor cause the processor to: access the database; and provide an accurate mask of at least one feature of interest based on the digital image.

8. The system of claim 1, wherein the memory has instructions thereon when executed by the processor cause the processor to: find identifiers in at least one original digital image and group all the digital images having a given identifier before identifying at least one first feature of interest in the original digital image.

9. The system of claim 1, wherein the proprietary medium is a digital photograph.

* * * * *